United States Patent
Shikari et al.

(10) Patent No.: US 11,122,575 B2
(45) Date of Patent: Sep. 14, 2021

(54) SIGNALING MESSAGING AND UE CAPABILITY WITH TAG AND COMPRESSION

(71) Applicant: Apple Inc., Cupertino, CA (US)

(72) Inventors: Murtaza A. Shikari, Mountain View, CA (US); Sree Ram Kodali, Sunnyvale, CA (US); Srirang A. Lovlekar, Cupertino, CA (US); Sethuraman Gurumoorthy, San Jose, CA (US); Srinivasan Nimmala, San Jose, CA (US); Adesh Kumar, San Jose, CA (US); Vijay Venkataraman, Sunnyvale, CA (US); Muthukumaran Dhanapal, Dublin, CA (US); Haijing Hu, Beijing (CN); Fangli Xu, Beijing (CN); Yuqin Chen, Shenzhen (CN); Xu Ou, San Jose, CA (US); Longda Xing, San Jose, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/894,146

(22) Filed: Jun. 5, 2020

(65) Prior Publication Data
US 2020/0305143 A1    Sep. 24, 2020

Related U.S. Application Data

(63) Continuation of application No. 16/437,223, filed on Jun. 11, 2019, now Pat. No. 10,701,700.

(60) Provisional application No. 62/751,946, filed on Oct. 29, 2018.

(51) Int. Cl.
| | | |
|---|---|---|
| H04W 72/04 | (2009.01) | |
| H04W 76/10 | (2018.01) | |
| H04L 5/00 | (2006.01) | |
| H04W 12/037 | (2021.01) | |

(52) U.S. Cl.
CPC ......... *H04W 72/048* (2013.01); *H04L 5/0032* (2013.01); *H04L 5/0053* (2013.01); *H04W 12/037* (2021.01); *H04W 76/10* (2018.02)

(58) Field of Classification Search
None
See application file for complete search history.

(56) References Cited

U.S. PATENT DOCUMENTS

| | | | |
|---|---|---|---|
| 8,355,721 | B2 | 1/2013 | Farnsworth |
| 9,009,322 | B1 | 4/2015 | Molleti |
| 10,051,574 | B2 | 8/2018 | Saeki |
| 10,172,181 | B2 | 1/2019 | Kim |
| 2004/0008650 | A1 | 1/2004 | Le |
| 2009/0156215 | A1 | 6/2009 | Pitkamaki |
| 2010/0330959 | A1 | 12/2010 | Mildh |

(Continued)

FOREIGN PATENT DOCUMENTS

WO    WO2018174995    9/2018

*Primary Examiner* — German Viana Di Prisco
(74) *Attorney, Agent, or Firm* — Kowert, Hood, Munyon, Rankin & Goetzel, P.C.

(57) ABSTRACT

This disclosure relates to techniques for reducing signaling overhead associated with signaling the capability of a wireless device and/or other messages. Among various possibilities, tags and/or compression may be used. Additionally, techniques for enhanced security and signaling between network devices are disclosed.

20 Claims, 11 Drawing Sheets

(56) References Cited

U.S. PATENT DOCUMENTS

| | | |
|---|---|---|
| 2014/0211620 A1 | 7/2014 | Kubota |
| 2014/0341075 A1 | 11/2014 | Hans |
| 2015/0312787 A1* | 10/2015 | Das .................. H04W 36/0033 370/331 |
| 2016/0262144 A1 | 9/2016 | Kitazoe |
| 2017/0367073 A1 | 12/2017 | Murugan |
| 2018/0199185 A1* | 7/2018 | Tenny .................... H04W 8/22 |
| 2018/0199273 A1 | 7/2018 | Chun |
| 2018/0219652 A1 | 8/2018 | Chen |
| 2018/0227904 A1 | 8/2018 | Raghunathan |
| 2018/0262905 A1 | 9/2018 | Dhanapal |
| 2018/0279168 A1 | 9/2018 | Jheng |
| 2019/0014562 A1 | 1/2019 | Yasukawa |
| 2019/0020998 A1 | 1/2019 | Takahashi |
| 2019/0082500 A1 | 3/2019 | Shi |
| 2019/0150031 A1 | 5/2019 | Balasubramanian |
| 2019/0239064 A1 | 8/2019 | Stojanovski |
| 2019/0281604 A1* | 9/2019 | Kim ........................ H04W 8/24 |
| 2019/0306925 A1 | 10/2019 | Iskander |
| 2019/0313239 A1 | 10/2019 | Horn |
| 2019/0357037 A1* | 11/2019 | Velev .................... H04W 76/25 |
| 2020/0245131 A1* | 7/2020 | Vandervelde ........... H04W 8/24 |
| 2020/0260264 A1* | 8/2020 | Hapsari .................. H04W 8/22 |

\* cited by examiner

SIGNALING MESSAGING AND UE CAPABILITY WITH TAG AND COMPRESSION

PRIORITY CLAIM

This application is a continuation of U.S. patent application Ser. No. 16/437,223, entitled "Signaling Messaging and UE Capability with Tag and Compression," filed Jun. 11, 2019, which claims priority to U.S. provisional patent application Ser. No. 62/751,946, entitled "Signaling Messaging and UE Capability with Tag and Compression," filed Oct. 29, 2018, which is hereby incorporated by reference in its entirety as though fully and completely set forth herein.

TECHNICAL FIELD

The present application relates to wireless communication, including methods, systems, and apparatuses to reduce signaling overhead.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. For example, the design of wireless networks may increasingly include carrier aggregation (CA). CA capabilities may vary between different wireless devices. Further, a wireless device may have different CA capabilities for different frequency ranges or bands. Accordingly, a wireless network may require information about a wireless device's CA capabilities in order to perform scheduling functions, e.g., assigning various carriers, frequency ranges, bands, and/or spectrum to the wireless device. Such CA capability information may require a significant amount of data (e.g., signaling overhead). Transmission of capability information may require large transmissions. Therefore, improvements in the field are desired.

SUMMARY

Embodiments are presented herein of, inter alia, systems, apparatuses, and methods for reducing signaling overhead as part of wireless communications.

As noted above, the number of use cases for wireless devices is growing, including use of carrier aggregation (CA). Different wireless devices may have different capabilities related to CA and may need to transmit capability information to networks. Such transmission may require large transmissions, e.g. signaling overhead. Various embodiments disclosed herein allow for reducing the amount of signaling overhead. In some embodiments, tags and/or compression may be used to compactly convey capability of the wireless device to the network. Further, in some embodiments, enhanced security techniques may be applied to capability reporting. In particular, a UE may decline to provide UE capability information prior to activation of security. Additionally, enhanced techniques may be used for communicating wireless device capability information between a base station and a core network entity.

In some embodiments, compression may be applied to other messages. For example, compression may be applied to reduce the size of various uplink and/or downlink signaling messages, e.g., including radio resource control (RRC) and/or non-access stratum signaling messages.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
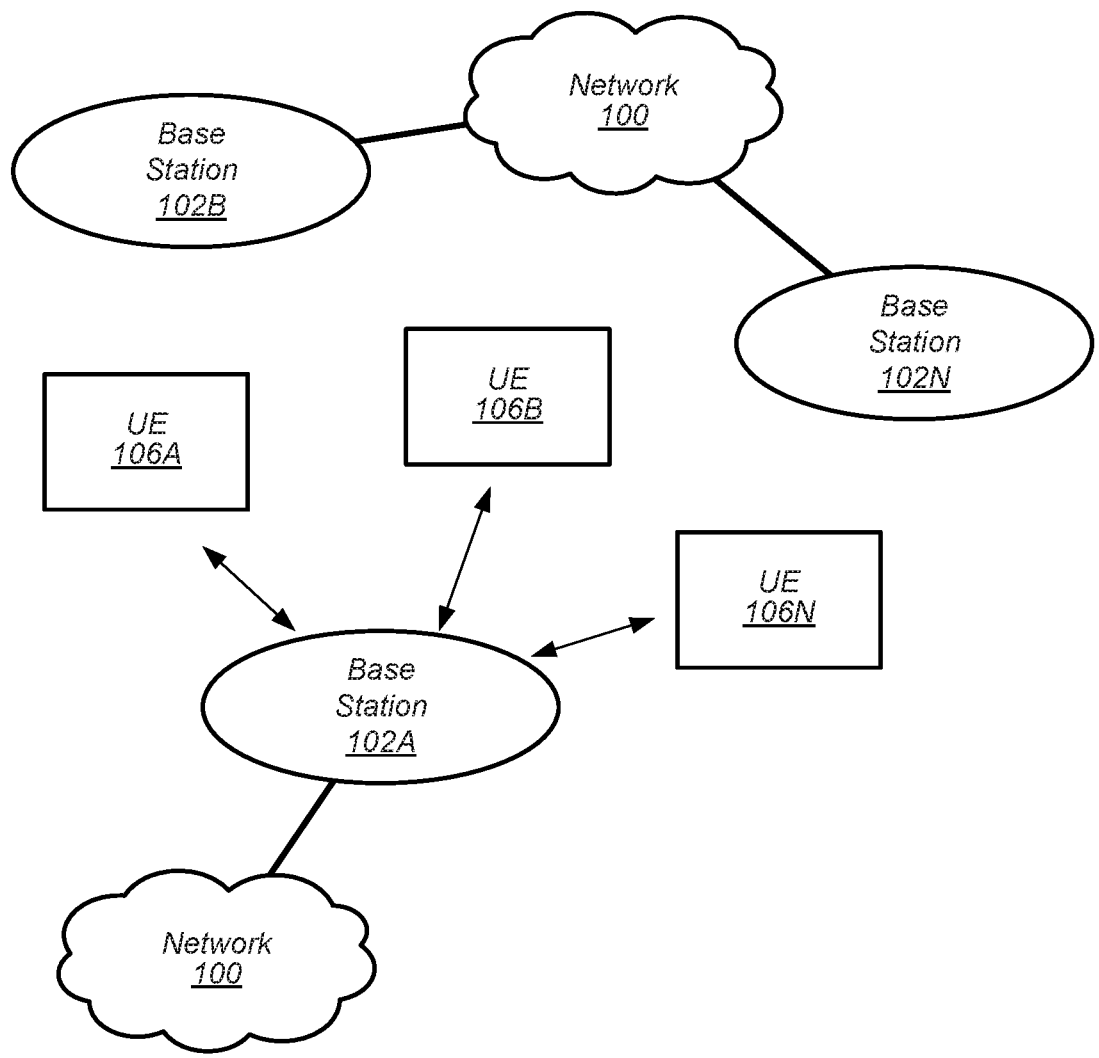
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
UMTS: Universal Mobile Telecommunications System
UTRAN: UMTS Terrestrial Radio Access Network or Universal Terrestrial Radio Access Network
UE: User Equipment
LTE: Long Term Evolution
NR: New Radio
E-UTRAN: Evolved UMTS Radio Access Network or Evolved Universal Radio Access Network
RRC: Radio Resource Control
RLC: Radio Link Control
MAC: Media Access Control
PDCP: Packet Data Convergence Protocol
RF: radio frequency
DL: downlink
UL: uplink
NW: Network
BS: base station
MME: Mobility Management Entity
AMF: Access Management Function
AS: access stratum
NAS: non-access stratum
RAT: radio access technology
PLMN: public land mobile network
LAA: licensed assisted access
CA: carrier aggregation
Rx: receiver
PDCCH: physical downlink control channel
PDSCH: physical downlink shared channel
PRB: physical resource block
DCI: downlink control information
SNR: signal-noise ratio
RSRP: reference signal received power
SF: subframe Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
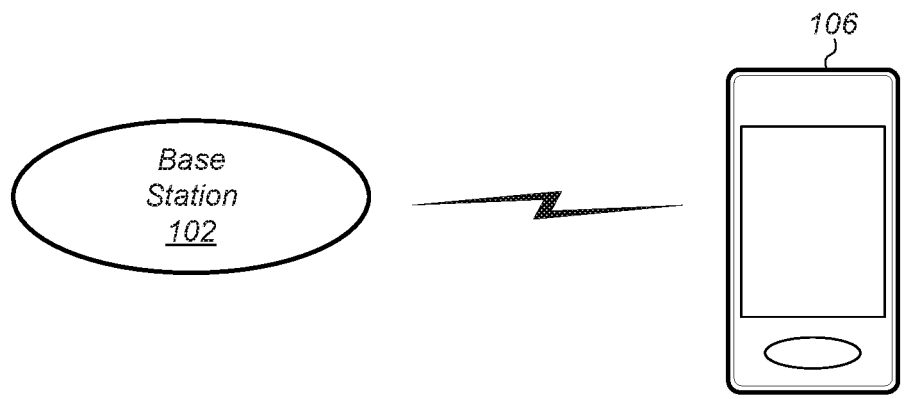
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for performing signal detection as described herein, e.g., according to one or more of the methods described herein. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple input multiple output (MIMO) communications) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

The UE 106 and/or BS 102 may be configured to perform carrier aggregation (CA). For example, the BS 102 may use carriers using any combination of RATs to communicate with UE 106. As one possibility, the UE 106 and BS 102 may employ licensed assisted access (LAA) techniques, and may thus aggregate licensed and unlicensed spectrum for communication.

Figure 3:
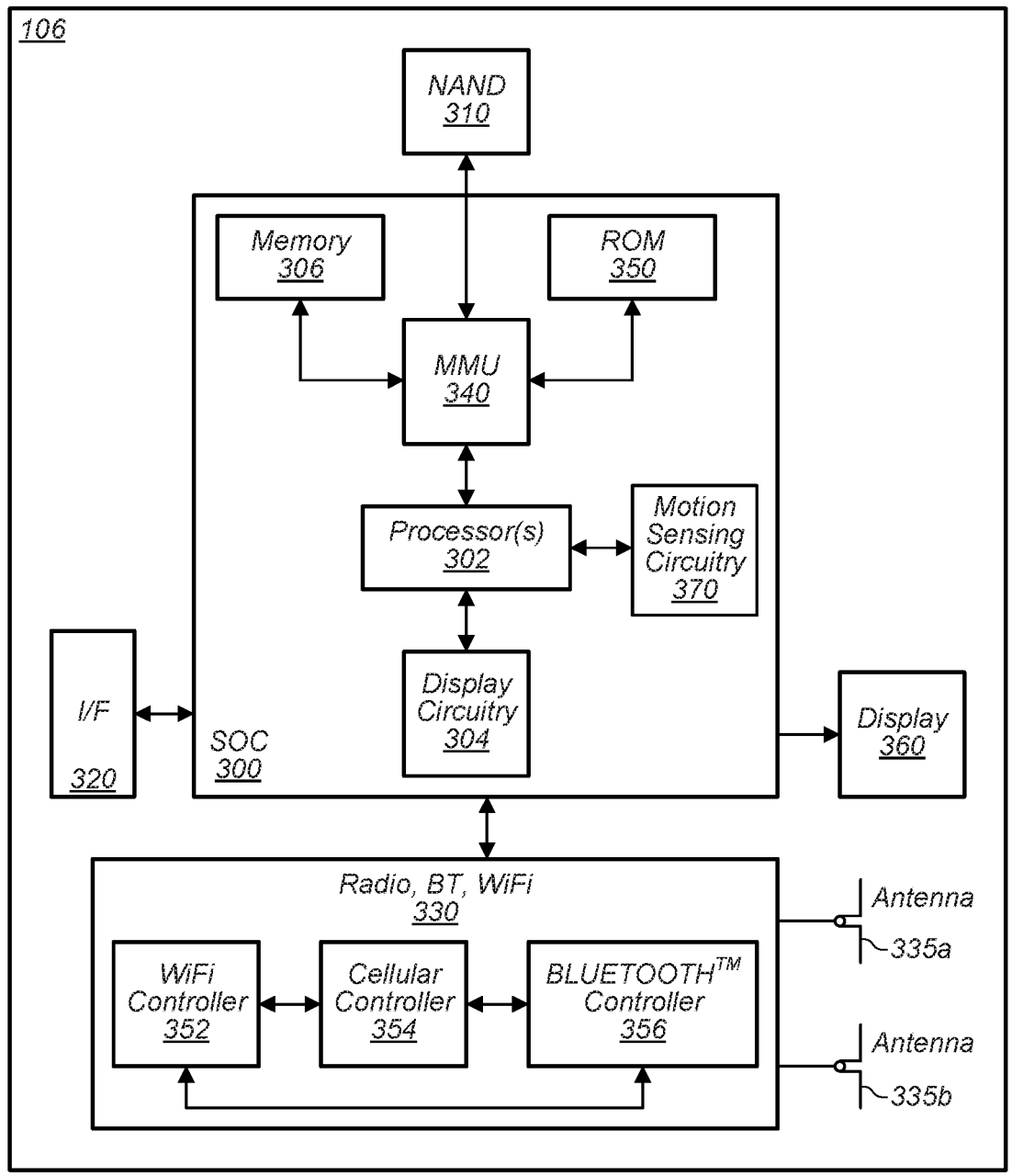
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b (and/or further additional antennas), for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
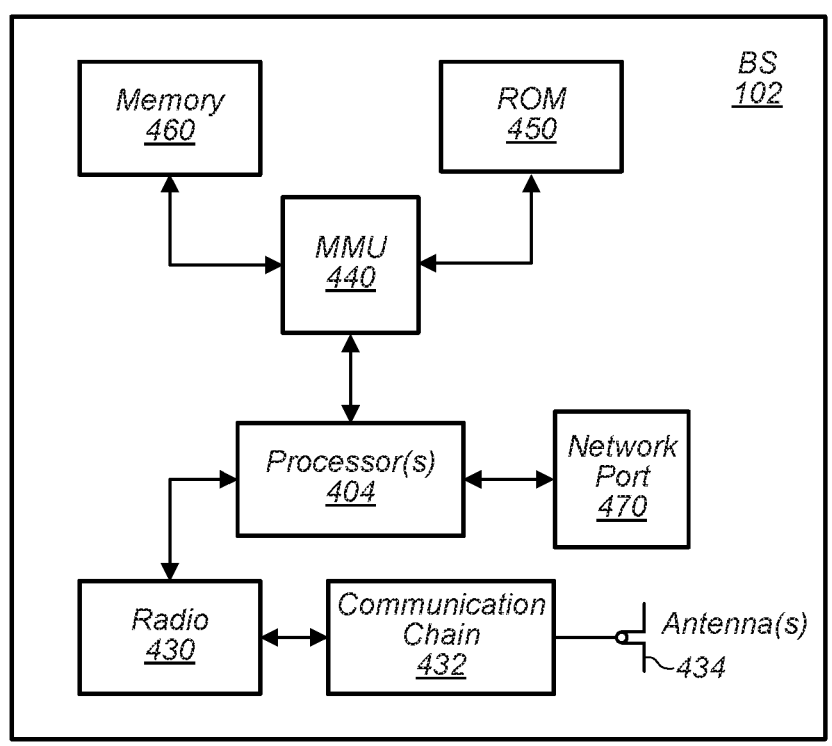
FIG. 4 illustrates an exemplary block diagram of a BS, according to some embodiments.

FIG. 4—Block Diagram of a Base Station (BS)

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430 (or multiple radios 430). The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.). The BS 102 may provide one or more cells of one or more communication technologies and/or one or more public land mobile networks (PLMNs). The BS 102 may provide multiple cells which may be organized, grouped, or configured as one or more cell sets, according to some embodiments. One or more cell sets that are provided by BS 102 may also include cells provided by one or more additional base stations, according to some embodiments.

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein. The BS 102 may be configured to perform carrier aggregation (CA).

The BS 102 may be an eNodeB (eNB) or gNodeB (gNB), according to some embodiments.

Figure 5:
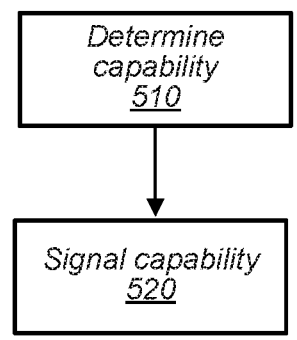
FIG. 5 is a flow chart diagram illustrating an exemplary method for signaling capability of a wireless device, according to some embodiments.

FIG. 5—Flow Chart Diagram

5G New Radio (NR) and LTE, as well as other wireless networks, may increasingly include carrier aggregation (CA), e.g., including licensed and/or unlicensed spectrum. CA techniques may allow for increased throughput or performance by efficiently using the spectrum/frequency resources available to a network. CA techniques may be used entirely in licensed spectrum, entirely in unlicensed spectrum, or in a mixture of licensed and unlicensed spectrum. For example, licensed assisted access (LAA) cells may be increasingly common. Note that an LAA cell may aggregate licensed and unlicensed spectrum of a radio access network, e.g., at a media access control level, among various possibilities. For example, an LAA cell (e.g., a special type of secondary cell or SCell) may operate in an unlicensed band and may be assisted by an LTE cell (e.g., a primary cell or PCell) that may operate in a licensed band.

Different UEs may have different capabilities with regard to CA. For example, some UEs may be able to perform CA with certain combinations of frequency ranges, but not with other combinations of frequency ranges. Accordingly, it may be beneficial for a UE to inform the network of its CA capabilities so that the network can use CA techniques for communicating with the UE. Network entities may request information about a UE's CA capabilities in general, or with respect to specific combinations of frequencies.

Similarly, different cells, different regions, or different networks may use various combinations of frequency ranges for CA. For example, a given PLMN may have licenses to use different frequency ranges in one region than another. Therefore, it may be beneficial for a UE to provide capability information to the network on a local or regional level, according to some embodiments.

In some embodiments, information about a UE's CA capabilities may be quite large due to the potentially large number of combinations between the various frequencies or frequency bands. For example, the information may be 9,000-10,000 bytes, among various possibilities. Accordingly, it may be beneficial for both the UE and the network to reduce the size of a message indicating the UE's capability and/or to reduce the number of times that such messages are sent.

FIG. 5 is a flow chart diagram illustrating a method for signaling UE capability information, according to some embodiments. Embodiments of the method of FIG. 5 may reduce signaling overhead relative to alternative techniques, e.g., by reducing the amount of data needed to inform a base station of a UE's capabilities, according to some embodiments.

In various embodiments, some of the elements of the method shown may be performed concurrently, in a different order than shown, may be substituted for by other method elements, or may be omitted. Additional method elements may also be performed as desired.

Aspects of the method of FIG. 5 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor(s) 404, baseband processor(s), processor(s) associated with communication circuitry (e.g., 430, 432), etc., among various possibilities) may cause the BS to perform some or all of the illustrated method elements. Note that while at least some elements of the method of FIG. 5 are described in a manner relating to the use of communication techniques and/or features associated with 3GPP specification documents, such description is not intended to be limiting to the disclosure, and aspects of the method of FIG. 5 may be used in any suitable wireless communication system, as desired. Further, although at least some elements of the method of FIG. 5 are described in a manner relating to a UE's capability to perform CA, these techniques may be applied to other types of information. For example, such techniques may be applied to other UE capabilities/features, UE preferences/settings, network features/capabilities/resources/settings/configurations, etc. The techniques of FIG. 5 may be applied to various RRC messages with significant payload size, among various possibilities. As shown, the method may operate as follows.

A wireless device (e.g., UE 106) may determine its capabilities (e.g., and/or other information) (510). For example, the UE may generate a capability string indicating a set (e.g., a complete set or a partial set/subset) of its capabilities with respect to CA. In some embodiments, the capabilities may be based on the hardware and/or software of the device, settings, battery level, location, motion, and/or other factors.

In some embodiments, the UE may make this determination in response to a message (e.g., a request or other enquiry) received from a network (e.g., BS 102). The network may make such an enquiry at any time. For example, a network may make such an enquiry in response to the UE establishing a connection with the network. The network may further consider any prior information it may have that is relevant to the UE's capabilities. For example, the network may consider any experience it has with similar (e.g., same or similar manufacturer, model, hardware, software, etc.) UEs. The network may consider information stored on the core network (e.g., at an MME, among various possibilities) and/or information stored at the BS 102. The BS 102 may request information from the core network and/or may maintain a local database of UE capability.

In some embodiments, the network may include a requested frequency band (RFB) in such an enquiry. An RFB may inform the UE to provide information relevant to one or more identified frequencies/bands, e.g., to provide a partial set or subset of its capabilities relevant to the identified frequencies/bands. Thus, the UE may not prioritize information about other frequencies not identified by the RFB and may thus reduce the volume of data associated with the determination. In some embodiments, the UE may not determine information about other frequencies (e.g., other than the frequencies identified by the RFB). In some embodiments, the UE may determine information about other frequencies, and may transmit such other information, e.g., depending on constraints such as space available in a capability message. If no RFB is included, the UE may determine information about all frequencies in a range relevant to communication between the UE and the network (and/or any other networks), e.g., a complete set of the UE's capabilities.

In some embodiments, the enquiry may explicitly or implicitly indicate the use one or more of various techniques for the UE to use in reporting UE capability to the network. Alternatively, or additionally, the enquiry may explicitly or implicitly forbid the use of one or more of such techniques for the UE to use in reporting UE capability to the network. Still further, the enquiry may not address the use or prohibition of use of one or more of such techniques for the UE to use in reporting UE capability to the network, and thus the UE may be permitted to determine whether or not to use such techniques according to its policies. Such techniques may be indicated as requested, required, discouraged, prohibited, or discretionary using any indication or combination of indications in the enquiry. For example, one or more fields or flags may be included or defined in the structure of the enquiry for this purpose. Still further, such use or prohibition may be set by network policy and/or may be transmitted separately from the enquiry.

The UE may make the determination of capabilities with any of various levels of specificity/detail. For example, the UE may make the determination in a targeted manner, e.g., in response to a request from a network for its capabilities for specific functions (e.g., to perform CA using specified frequency ranges, among various possibilities). Alternatively, the UE may make a more general determination, e.g., by developing a report specifying its CA capabilities for a wide range of frequency ranges.

The UE may signal its capability to the base station (520). In other words, the UE may transmit one or more messages indicating information about the set of UE capabilities. The signal may be transmitted in any of various formats and may include various levels of detail, as explained below with respect to FIGS. 6-21. Among various possibilities, the signal may use a tag (e.g., a hash) and/or compression to reduce the amount of data in the signal. In some embodiments, the BS may configure the UE to perform CA according to the UE capabilities as indicated by the signal. Further, the UE and the base station may communicate (e.g., exchange any number of messages including control/signaling messages and/or payload/application data) according to the capabilities of the UE.

In some embodiments, the UE capability (e.g., full capability, or a more limited capability, such as an RFB capability) may be stored by one or more network elements, e.g., at an MME and/or BS, e.g., the serving BS. Such information may be stored for any number of UEs. Such information may further include other details about the UE (e.g., manufacturer, model, hardware, software versions, etc.). The UE capability information may be provided by the serving BS and/or MME (AMF, or other network element) to a target BS (and/or other network element(s)) during handovers.

FIGS. 6-21 and the following additional information are provided as being illustrative of further considerations and possible implementation details relating to the method of FIG. 5 and are not intended to be limiting to the disclosure as a whole. Numerous variations and alternatives to the details provided herein below are possible and should be considered within the scope of the disclosure.

FIGS. 6-9—Tagging Techniques

Figure 6:
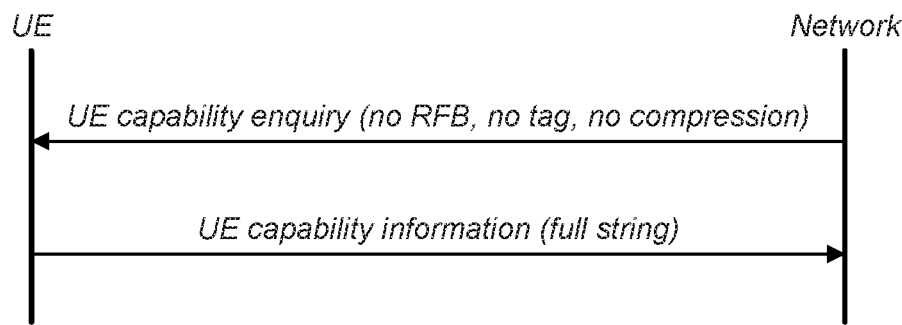
FIGS. 6 and 7 are signal flow diagrams illustrating exemplary methods for signaling the capability of a wireless device, according to some embodiments.

FIG. 6 illustrates a communication flow between a network (e.g., BS 102) and a wireless device (e.g., UE 106). The BS may transmit a UE capability enquiry to the UE. In the illustrated example, the capability enquiry may not specify use of RFB, tagging, or compression, or may prohibit use of such techniques.

In response to the capability enquiry, the UE may generate and transmit UE capability information. In some embodiments, the UE may transmit full capability information. Such a report may be uncompressed and may include all CA capabilities, e.g., the report may be a full string. In other words, the UE may determine its capabilities and may generate a full capability string followed by transmission of the full string.

Figure 7:
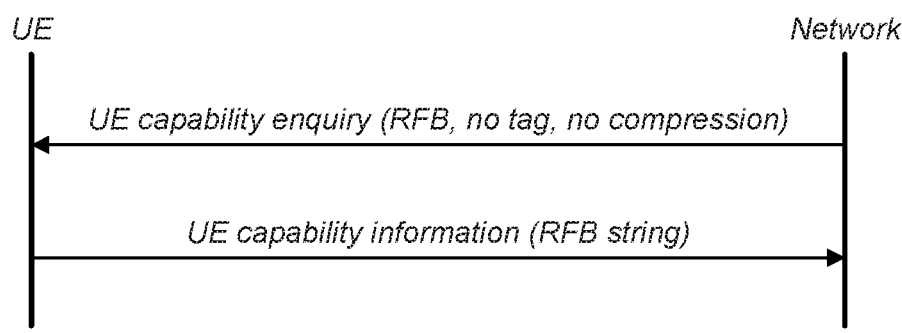

FIG. 7 illustrates a communication flow between a network (e.g., BS 102) and a wireless device (e.g., UE 106). The BS may transmit a UE capability enquiry to the UE. In the illustrated example, the capability enquiry may specify or permit use of RFB and may not specify use of, or may prohibit, tagging, or compression.

In response to the capability enquiry, the UE may transmit UE capability information according to the RFB. Such a report may be uncompressed and may include CA capabilities relevant to the RFB, e.g., the report may be an RFB string.

Figure 8:
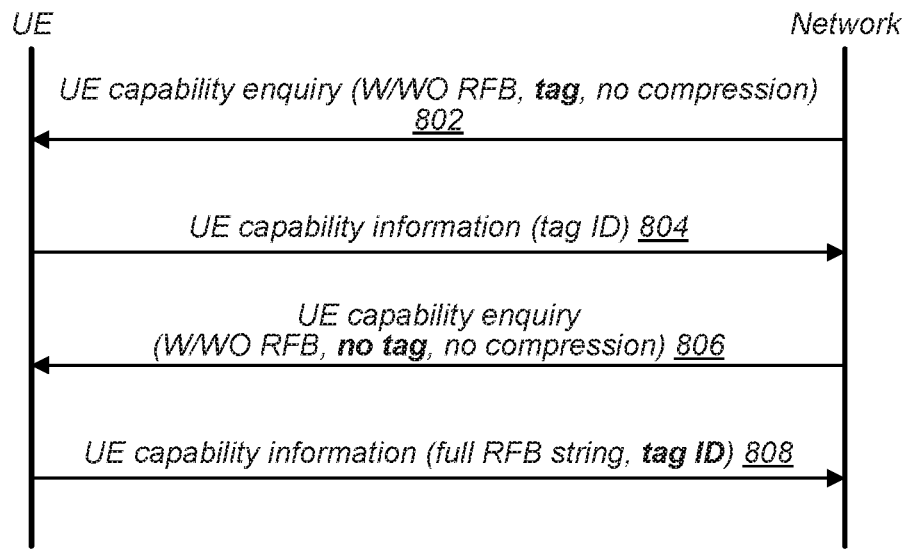
FIG. 8 is a signal flow diagram illustrating an exemplary method for signaling the capability of a wireless device using a tag, according to some embodiments.

FIG. 8 illustrates a communication flow between a network (e.g., BS 102) and a wireless device (e.g., UE 106) using tagging. The BS may transmit a UE capability enquiry to the UE (802). In the illustrated example, the capability enquiry may specify use of tagging (or may permit use of tagging). The enquiry may or may not specify use of RFB.

In response to the capability enquiry, the UE may transmit UE capability information using a tag identification (tag ID) (804). The tag ID may be based on a full capability string or an RFB capability string. The tag ID may be generated, at least in part, as a hash of the (full or RFB) capability string, e.g., a capability hash ID. To generate a capability hash ID, the UE may internally build the (full or RFB) capability string and transform the string to a hash, e.g., using a hash algorithm. In some embodiments, the capability hash ID may be the tag ID.

In some embodiments, the tag ID may be further based on device information. For example, in addition to the capability hash ID, the UE may also generate a device hash ID. The device hash ID may be a hash of one or more UE implementation parameters such as: region (e.g., country) of operation (e.g., which may impact capability due to differences in enabled features in different countries), configurations applied, user settings, hardware version, software version, etc. The tag ID may be based on a combination of the capability hash ID and the device hash ID, e.g., the two hash IDs may be concatenated. Alternatively, the tag ID and the device hash ID may be transmitted separately.

In some embodiments and circumstances, the tag ID may provide sufficient information for the network to identify the capability of the UE. For example, if the network (e.g., MME, BS, or other network element) has a record of the capabilities associated with the tag ID, the network may not require further information. Accordingly, the UE and network may proceed to exchange further messages including control signaling and/or user data.

However, if the network is not able to identify the capabilities associated with the tag ID (e.g., if the UE is the first device of its type/capability to operate in a given area on the network), the network may send a second capability enquiry (806). The second capability enquiry may be similar to the first capability enquiry, but may not indicate tagging. In other words, the second capability enquiry may request a full or RFB capability string. Although in the illustrated example, the second capability enquiry specifies no compression, it will be appreciated that compression may be indicated.

In response to the second capability enquiry, the UE may transmit the requested information (808). The UE may further include the tag ID with the capability information. In response, the network (e.g., BS and/or MME, or other entity) may store the UE's capability information and may associate this information with the tag ID. Accordingly, the network may be able to recall the capabilities of the UE (or other UEs with the same tag ID, e.g., other UE's with the same capabilities) based on the tag ID. Thus, it may only be necessary for the first UE of a given type/capability to operate in a given area to signal the full or RFB capability to the network in that area.

In some embodiments, the UE may adjust a band order in preparing a capability hash ID using RFB (in 804). This may reduce the number of possible hash IDs indicating the same capability, and thus reduce signaling overhead (e.g., as the network will need to request full/RFB capability strings for fewer tag IDs, e.g., 806 and 808). For example, the UE may adjust the capability string so that a capability hash ID in response to an RFB with band (or bandwidth) order 4-2-12 may be the same as the capability hash ID in response to an RFB with band order 2-4-12. For example, the UE may arrange bands in ascending order (descending order or other orders may also be used). In other words, the UE may adjust a band order received in an RFB capability enquiry and prepare and transmit a hash ID based on the adjusted order. In some embodiments, there may be no benefit in making different strings for different band orders. For example, if a device already reported one hash ID (e.g., HASH-ID1), it may not attempt to make another hash ID for same capability just because of band order change. Instead, it may report the same HASH-ID1 (e.g., using an adjusted band order) as long as the set of RFB bands are same. The UE may further confirm that the number of CA combinations reported in the first ordering instance is less than the maximum number of CA combinations allowed via ASN.1 limits to be advertised in the RRC UE Capability Container.

Similarly, for the non-RFB case, the wireless device may arrange bands in a consistent, adjusted (e.g., ascending) order and may generate the UE capability string using the adjusted order, e.g., as long as the total number of CA combinations possible with all the bands supported by the UE is less than the maximum number allowed to be advertised via ASN.1 limits for the RRC UE Capability container. In other words, the same order may be used for CA band capability, e.g., an ascending or descending order may be used.

Further, the wireless device may also adjust/arrange CA combination ordering based on UL/DL MIMO capability and/or UL256 quadrature amplitude modulation (QAM) capability (or any other capability/technique/procedure indicated per CA combination). For example, the CA combinations may be arranged in ascending (e.g., or descending) order based on throughput such that the strings (and thus tags) remain consistent across devices that have the same overall UE capability. In other words, the wireless device may use a consistent ordering scheme so that the mapping between capability strings and capabilities are consistent. For example, consider a first combination and a second combination have the same set of bands/frequencies (e.g., and may have the same bandwidth classes, e.g., 41C and B42C). However, these combinations may have different MIMO and/or QAM capabilities and therefore different throughput, e.g., a higher MIMO or QAM level may lead to a higher throughput. Accordingly, these combinations may be ordered based on their overall throughput.

Figure 9:
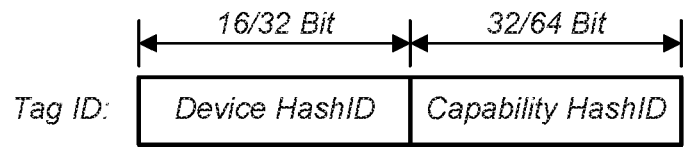
FIG. 9 is a block diagram illustrating exemplary tag generation techniques, according to some embodiments.

FIG. 9 illustrates a tag ID, according to some embodiments. As described above, the tag ID may be a combination of a device hash ID and a capability hash ID. As illustrated, the device hash ID may be 16 or 32 bits, for example, and the capability hash ID may be 32 or 64 bits. The two hash IDs may be concatenated to create the tag ID. Note that the illustrated structure is exemplary only. The hash IDs may be other lengths and/or may be combined in different ways. Additional or different components (e.g., other hash IDs) may be included.

In some embodiments, device manufacturers may need to ensure unique device hash IDs across the range of devices that they manufacture. For example, a company A may reserve range 0x001000 to 0x001999, and company B may reserve range 0x002000 to 0x002999. An ID or range of IDs may be reserved for new manufacturers. If a manufacturer detects collision between tag IDs generated for different capability strings, the manufacturer may adjust the capability or device strings to avoid such collisions, e.g., by changing a string in a way that changes the hash without changing the meaning. For example, a generated UE capability string or UE device string can be extended to include padding with additional zeros at end. This padded string can be sent to a hash algorithm. In other words, because the network may not detect collisions between tag IDs, the device manufacturer may attempt to guarantee unique tag IDs, e.g., using a device hash ID or a padded string.

In some embodiments, if a manufacturer chooses not to generate a tag ID for a given capability string, the wireless device may use some reserved value as the tag ID or send the complete capability string instead of a tag ID. For example, a model-ID 0xFFFF may be reserved, and may be used to represent model-id as un-known. In some embodiments, a wireless device may use such a reserved value if Model-ID is transmitted before enabling ciphering, e.g., to protect/conceal the identity of the device.

FIGS. 10-14—Compression Techniques

Figure 10:
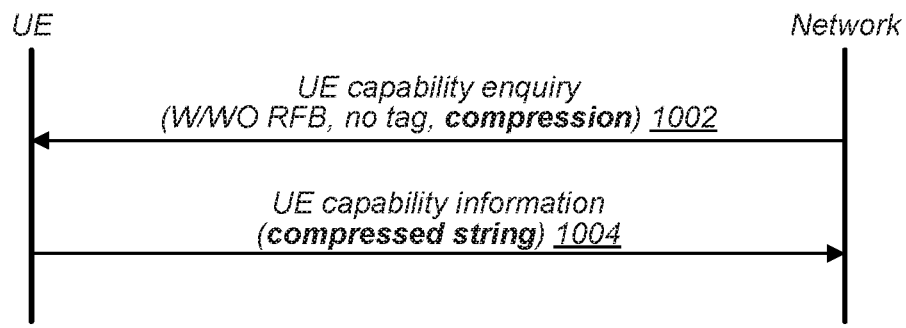
FIG. 10 is a signal flow diagram illustrating an exemplary method for signaling the capability of a wireless device using compression, according to some embodiments.

FIG. 10 illustrates a communication flow between a network (e.g., BS 102) and a wireless device (e.g., UE 106) using compression. The BS may transmit a UE capability enquiry to the UE (1002). In the illustrated example, the capability enquiry may specify or permit use of compression and may not specify use of, or may prohibit, tagging.

In response to the capability enquiry, the UE may transmit UE capability information using compression (1004). For example, the UE may use a compression algorithm such as DEFLATE (other algorithms are possible) to compress the full or RFB capability string. In some embodiments, compression may reduce the message size of capability string by more than 50%, among various possibilities. In some embodiments, the compression may be used for same packet compression (however cross packet compression may also/alternatively be used).

Figure 11:
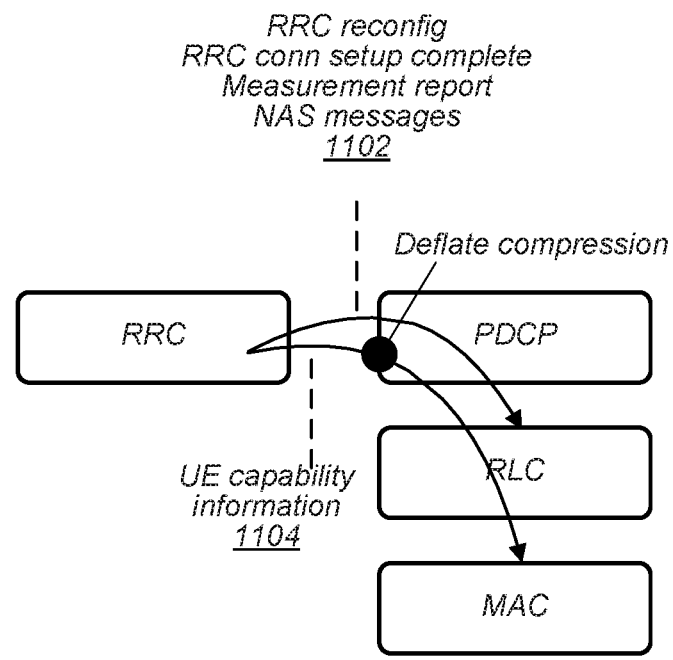
FIG. 11 is a block diagram illustrating exemplary compression techniques, according to some embodiments.

FIG. 11 illustrates communication between the two devices using compression, in context of the layers of the devices. The UE may send first messages (1102) to the BS. The messages may include RRC reconfiguration complete, RRC connection setup complete, measurement reports, NAS messages, etc. The first messages may be sent from the RRC layer, through the PDCP layer, to the RLC layer. The first messages may not be compressed.

The UE may further transmit a second message (1104). For example, the second message may contain the UE's capability information. Alternatively, the second message may include other information. The second message may be sent from the RRC layer, compressed at or before the PDCP layer, and transmitted through the RLC and MAC layers.

Note that similar compression techniques may also be applied to messages from the network to the UE, e.g. RRC reconfiguration, etc. Similarly, such a message may be sent from the RRC layer, compressed at or before the PDCP layer, and transmitted through the RLC and MAC layers.

Figure 12:
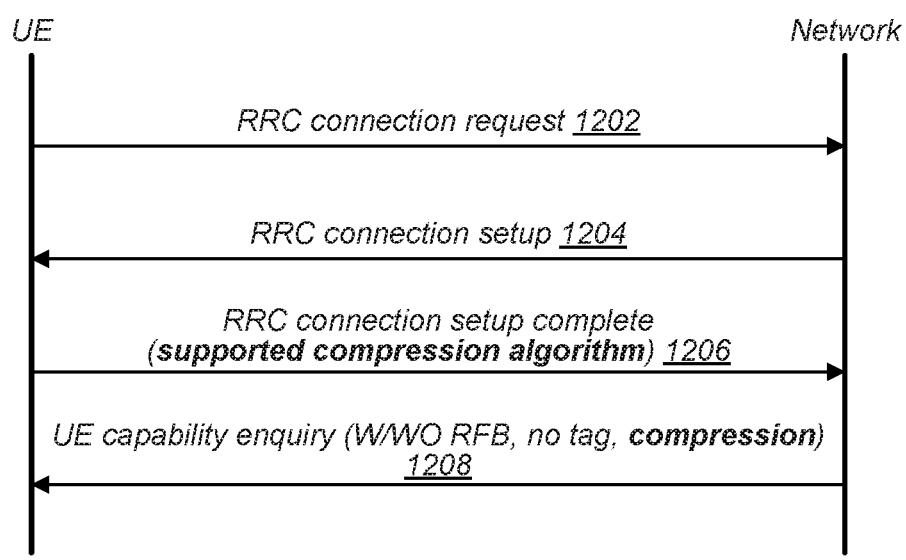
FIGS. 12 and 13 are signal flow diagrams illustrating exemplary methods for signaling the capability of a wireless device using compression, according to some embodiments.

FIG. 12 illustrates a communication flow between a network (e.g., BS 102) and a wireless device (e.g., UE 106) using compression.

The UE may send an RRC connection request to the BS (1202). The BS may send an RRC connection setup message (1204). The UE may send an RRC connection setup complete message (1206). The RRC Connection Setup complete may indicate one or more compression algorithms supported by the UE. Alternatively, the RRC Connection Setup complete may indicate that the UE does not support compression. Additionally, or alternatively the UE may signal one or more supported compression algorithms in other signaling messages. For example, the UE may include an indication of supported compression in an RRC connection request or along with UE capability information, among various possibilities. The network may send a capability enquiry, which may specify compression (1208), e.g., in response to an indication that the UE supports at least one compression algorithm. The network may choose one of the supported compression algorithms and indicate the chosen algorithm in the UE capability enquiry. If the UE does not support compression with that chosen algorithm, the UE response may indicate a non-compressed capability report. Similarly, the BS may indicate, e.g. in the capability enquiry, that the UE should send a non-compressed capability report.

Figure 13:
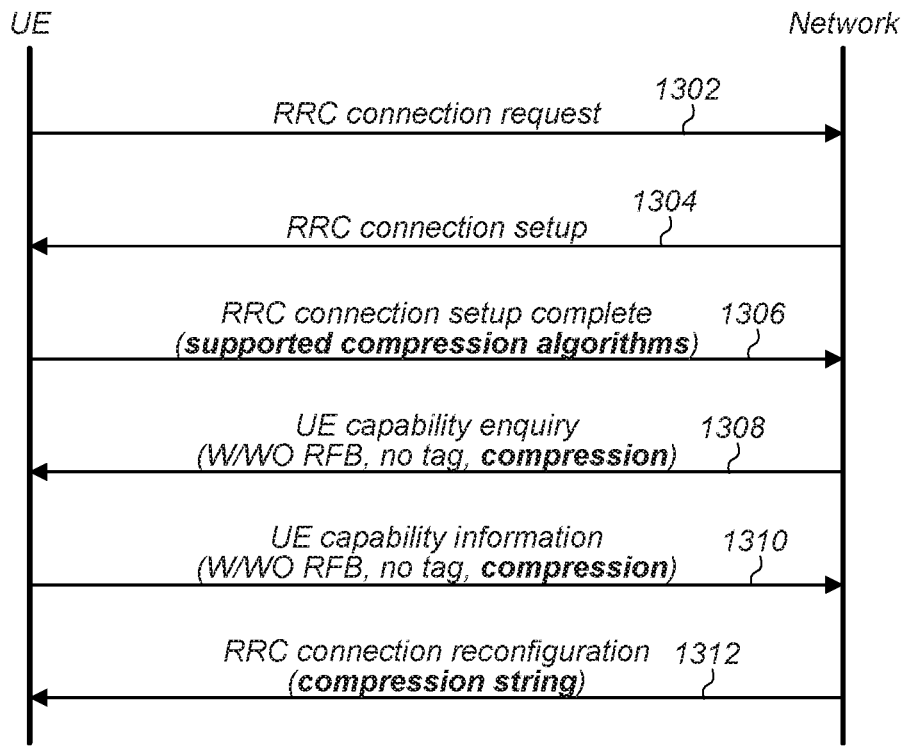

FIG. 13 illustrates a communication flow between a network (e.g., BS 102) and a wireless device (e.g., UE 106) using compression. In some embodiments, the NW and UE may communicate with compressed signaling messages in both uplink and downlink directions. For example, in addition to the uplink UE capability response, certain downlink messages (e.g., RRC configuration) can also be large, and therefore may benefit from compression. In some embodiments, the RRC configuration may be large (e.g., in NR) due to inclusion of beam forming and/or bandwidth part related configuration parameters. Accordingly, the (e.g., uncompressed) RRC configuration may be hundreds of kilobytes, among various possibilities. Thus, there may be significant reduction in the message size by compression of such an RRC configuration message.

The UE may send a RRC connection request to the BS (1302). The BS may send a RRC connection setup message (1304). The UE may send an RRC connection setup complete message (1306). The RRC Connection Setup complete may indicate one or more compression algorithms supported by the UE. The network may send a capability enquiry, which may specify compression (1308). The network may choose one of the supported compression algorithms and indicate the chosen algorithm in the UE capability enquiry. The UE may transmit its capability information (1310), e.g., as a compressed string using the indicated compression algorithm. In response to the capability information, the BS may transmit an RRC connection reconfiguration message (1312). The RRC connection reconfiguration message may also be transmitted as a compressed string using the indicated compression algorithm. It will be appreciated that the techniques of FIG. 13 can be applied to any type of signaling between the UE and NW, in both the uplink and downlink directions. For example, NAS and RRC signaling may be compressed according to these techniques.

It will be appreciated that the sequence of messages illustrated in FIG. 13 is exemplary only. For example, compression may be applied to any RRC configuration (or reconfiguration) message, e.g., with any arbitrary relation to communication about a UE's capability for CA. In other words, aspects of the method of FIG. 5 may be applied to a communication flow similar to that of FIG. 13, but omitting messages directly related to UE capability, e.g., 1308 and 1310. Thus, a reconfiguration message may be compressed, even if it is transmitted prior to (or in the absence of) any exchange about UE capability.

As a further possibility, an RRC connection request (1302) may include an indication of supported compression algorithms. For example, the indication may be explicit (e.g., a value in a field) or may be implicit (e.g., based on information about a type or characteristic of the device, such as model, software, etc.). Thus, the network may determine that the UE supports decompression based on the indication, e.g., including any information about the compression algorithms supported according to device type/characteristic. In response, the network may send an RRC connection setup request (1304) that is compressed, e.g., according to a supported compression algorithm.

Figure 14:
FIG. 14 is a block diagram illustrating exemplary compression techniques, according to some embodiments.

FIG. 14 illustrates a possible configuration of a signaling message. Signaling messages may have a field (e.g., "compression indicator") that indicates if the byte stream following that field is compressed or not. In some embodiments, the field may indicate the compression algorithm used in that message. The compression indicator field may be added in RRC, among various possibilities. Alternatively, the compression indicator may be added to a PDCP header for a signaling radio bearer (SRB). Thus, the compression indicator may not (e.g., need to be) added in the upper layer protocols like NAS or RRC.

In some embodiments, downlink signaling messages may be compressed by a base station or NW element only if the NW can determine based on UE capability that the UE supports decompression. Uplink signaling messages may be compressed by the UE (e.g., if it supports such compression) after it is configured by the NW to do so. Alternatively, the UE may start to compress messages in the uplink directions after it observes the first downlink compressed message by the NW. In other words, a compressed message may be treated as an indication that compression is supported. For example, in response to a message from the UE (or NW) including a compressed string, a NW (or UE) may infer that compression is supported and may begin transmitting compressed messages to the UE (or NW). Still further, a UE may be configured to transmit compressed messages to a NW without any explicit indication that the NW supports compression. For example, a UE may infer that a NW operating according to a particular RAT may support certain compression algorithms.

Figure 15:
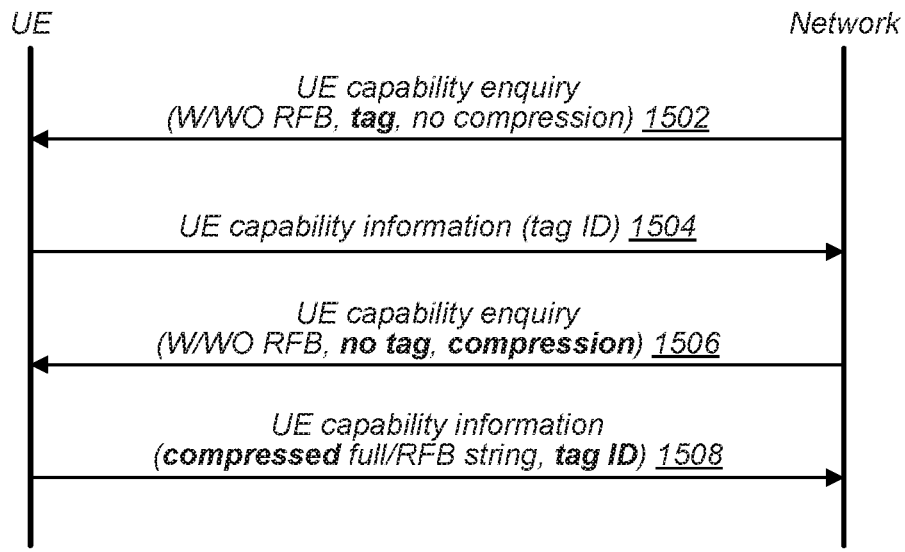
FIG. 15 is a signal flow diagram illustrating an exemplary method for signaling the capability of a wireless device using tagging and compression, according to some embodiments.

FIG. 15—Tagging and Compression

FIG. 15 illustrates a communication flow between a network (e.g., BS 102) and a wireless device (e.g., UE 106) using tagging with compression. The BS may transmit a UE capability enquiry to the UE (1502). In the illustrated example, the capability enquiry may specify or permit use of tagging and may not specify use of, or may prohibit, compression.

In response to the capability enquiry, the UE may transmit UE capability information using tagging, e.g., the UE may transmit a tag ID (1504). Note that the UE may use an un-compressed UE capability string as input to a hash algorithm.

In the event that the NW does not recognize the tag ID (e.g., does not have a database entry specifying the meaning of the tag ID, e.g., the capability associated with the tag ID), the BS may transmit a second capability enquiry (1506). The second capability enquiry may specify compression, but not tagging.

In response to the second capability enquiry, the UE may transmit the capability as a compressed string (e.g., full or RFB) (1508). The UE may further transmit the tag ID. Thus, the NW may then store the UE capability information, based on the compressed transmission, and associate the capability information with the tag ID.

Figure 16:
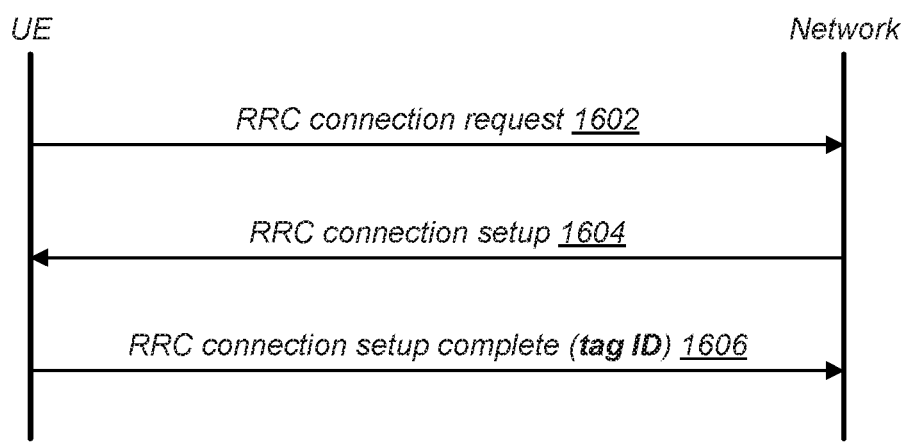
FIG. 16 is a signal flow diagram illustrating an exemplary method for signaling the capability of a wireless device during connection setup, according to some embodiments.

FIG. 16—Capability Indication During Connection Setup

FIG. 16 illustrates a communication flow between a network (e.g., BS 102) and a wireless device (e.g., UE 106) using tagging and/or compression during RRC connection setup. In some embodiments, the UE may determine to change the UE capability between RRC connections (e.g., potentially for each RRC connection). Such changes may be based on battery level, thermal conditions of the UE (e.g., overheating), channel conditions, etc.

The UE may send a RRC connection request to the BS (1602). The BS may send a RRC connection setup message (1604). The UE may send a RRC connection setup complete message (1606).

In some embodiments, the RRC Connection Setup complete may include the UE capability information as a tag ID. In some embodiments, the UE may include the tag ID in each RRC connection setup complete message, e.g., regardless of whether it is requested. Due to the small size of the tag ID (e.g., 32 or 64 bits, among various possibilities), inclusion of the tag ID may not cause a large increase in signaling overhead. By including the tag ID in RRC connection setup complete, the latest (e.g., most current/accurate) UE capability may be indicated to network. Further, including the tag ID in RRC connection setup complete may eliminate or reduce the need for the NW to send capability enquiries to the UE.

In some embodiments, the tag-ID may be set to some sentinel or defined value (for instance 0xFFFF_FFFF, e.g., or another value which may be defined in 3GPP standards or via proprietary signaling) in order to indicate or imply that the wireless device is requesting the network to re-initiate the capability procedure. Such an indication may be used to indicate that the capability of the UE has changed. In response to receiving an RRC connection setup complete message with such a defined tag ID, the NW may respond with a capability enquiry according to any of the techniques disclosed herein.

In some embodiments, the RRC Connection Setup complete may include the UE capability information in a compressed format. In some embodiments, the UE may include the tag ID in each RRC connection setup complete message, e.g., regardless of whether it is requested. The compressed form of the capability information may reduce signaling overhead relative to uncompressed transmission of the information. By including the compressed capability information in RRC connection setup complete, the latest (e.g., most current/accurate) UE capability may be indicated to network. Further, including the capability information in RRC connection setup complete may eliminate or reduce the need for the NW to send capability enquiries to the UE.

Figure 17:
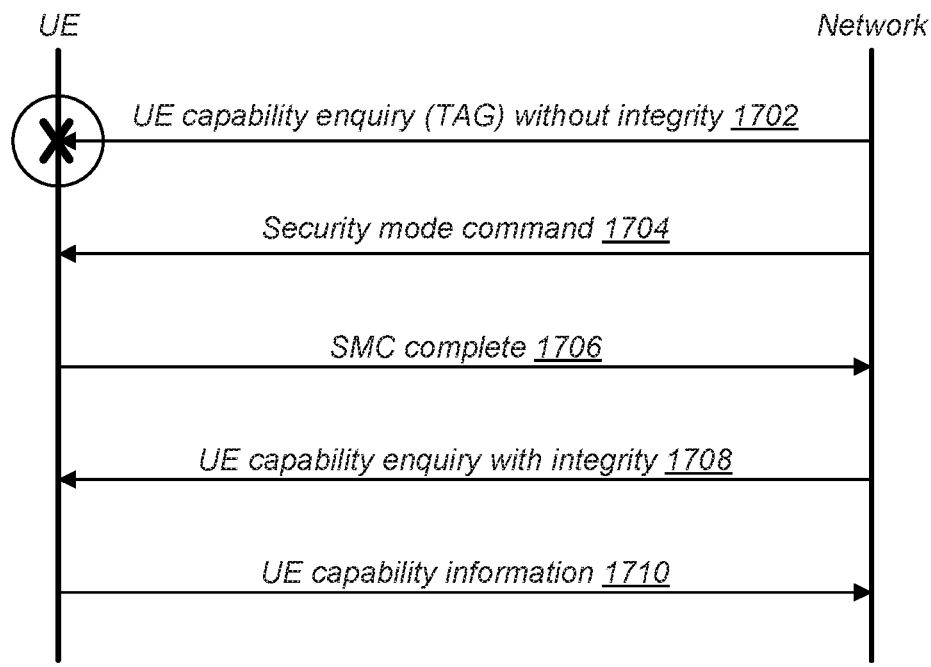
FIG. 17 is a signal flow diagram illustrating an exemplary method for signaling the capability of a wireless device with enhanced security, according to some embodiments.

FIG. 17—Enhanced Security

FIG. 17 illustrates a communication flow between a network (e.g., BS 102) and a wireless device (e.g., UE 106) using techniques to enhance security, according to some embodiments. The BS may transmit a first capability enquiry to the UE (1702).

In some embodiments, the first capability enquiry may specify the use of tagging. However, the first enquiry may be transmitted prior to securing the connection. Accordingly, including the model ID (or other similar information) in a device hash ID may pose a privacy risk to the user. Similarly, providing capability information may also pose a privacy risk to the user. For example, capability information may be considered sensitive because the capability information may (e.g., implicitly) reveal the model of the UE, similar to the model ID. Accordingly, the UE may determine not to provide a tag ID that is based on such identifying information or to otherwise provide capability information prior to establishment of security procedures, e.g., under some circumstances. Instead, the device may proceed to transmit a UE capability string (e.g., compressed, or uncompressed) that specifies (e.g., some) capabilities but may not reveal identifying information, according to some embodiments. For example, establishment of ciphering for emergency calls may not be possible prior to transmission of some capability information. Therefore, for emergency calls, the UE may restrict the means for providing UE capability information and may provide the network with a (full or RFB) capability string only, e.g., instead of a tag ID. In some embodiments, the UE may, based on determining an urgent reason to provide capability information, such as an emergency call, the UE may provide a tag ID.

Alternatively, as in the illustrated example, the UE may simply ignore the enquiry and wait to provide capability information until after security is established. For example, except in circumstances (such as related to an emergency call) in which providing capability information is urgent, the UE may not provide capability information prior to establishing security. In other words, the UE may determine that security is established prior to transmitting a tag ID or capability string.

The BS may proceed to transmit a security mode command (SMC) to the UE (1704), e.g., without receiving a response to the capability enquiry. In response to the SMC, the UE may transmit an SMC complete message (1706). In response to the SMC complete, the BS may transmit a second capability enquiry (1708). This second enquiry may have integrity, e.g., because the security is established. The UE may respond to the second enquiry by providing the requested capability information (1710). For example, the UE may transmit a tag ID or the UE may provide a compressed capability string.

In some embodiments, the UE may transmit the requested capability information (1710) based on the first capability enquiry. In other words, the UE may keep the first capability enquiry message pending while the security procedure is completed. Accordingly, after the SMC complete (1706), the UE may also send the capability information (1710), e.g., without waiting for the BS to send the second capability enquiry (1708). In other words, 1708 may be omitted, according to some embodiments.

FIGS. 18-21 and Additional Information

FIGS. 18-21 illustrate signaling between network elements, e.g., between a BS 102 and an MME or AMF. In some embodiments, various messages between the MME/AMF and BS may carry a tag ID in order to transfer information about the UE capability. Although the illustrated examples may refer to an MME, it should be noted that an AMF or other network element may perform the indicated functions.

Figure 18:
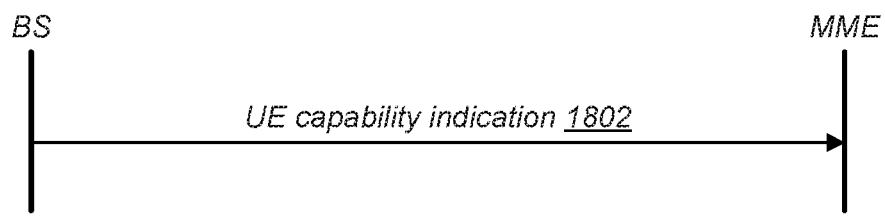
FIGS. 18-21 are signal flow diagrams illustrating exemplary methods for signaling the capability of a wireless device between network elements, according to some embodiments.

FIG. 18 illustrates a UE capability indication transmitted from the BS to the MME (1802). The capability indication may include a tag ID and may also include a (full or RFB) string. The string may be compressed or may be uncompressed. The BS may transmit the capability indication to the MME in response to (or following) receiving the information from the UE. For example, after receiving a UE capability report from a UE that is the first of a given model to operate in the area, the BS may provide both the tag ID and the capability string to the NW, so that the NW may store this information and make it available to other base stations. The BS may also store this information for future use, e.g., with the same or other UEs.

Figure 19:
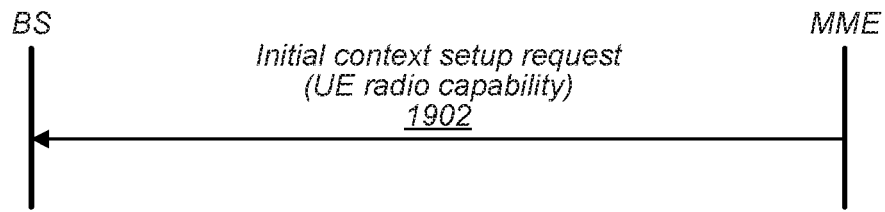

FIG. 19 illustrates an initial context setup request transmitted from the MME to the BS (1902). The request may include a UE radio capability indication, e.g., a tag ID and/or a capability string. The capability indication may be useful to the BS prior to and/or during establishing context for a connection with the UE.

Figure 20:

Similarly, FIG. 20 illustrates a connection establishment indication transmitted from the MME to the BS (2002). The connection establishment indication may include a UE radio capability indication, e.g., a tag ID and/or a capability string. The capability indication may be useful to the BS prior to and/or during establishing a connection with the UE. For example, the MME may provide the indication to a BS receiving a handover of the UE.

Figure 21:
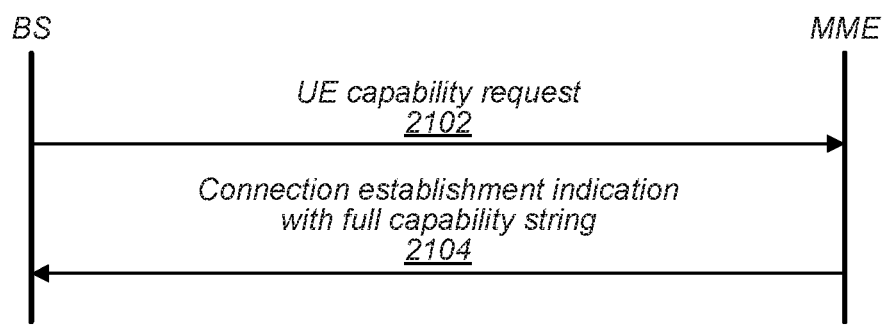

FIG. 21 illustrates a method for a BS to request conversion between a tag ID and a full string capability indication from the core network. As illustrated, the BS may transmit a UE capability request message to the MME (2102). The BS may transmit such a request in response to receiving a connection request and/or any other message from the UE that includes a tag ID. The MME may respond to the capability request with a full (e.g, or RFB) string capability indication, indicating the UE's capabilities (2104). The capability string may be transmitted with a connection establishment indication or may be transmitted independently, among various possibilities.

Although several of the above embodiments have been described with respect to an MME, it will be appreciated that other network elements may perform these functions and may apply the techniques disclosed herein. For example, in context of a network operating according to 5G NR, an Access Management Function (AMF) may perform these functions.

Exemplary embodiments are described below.

In some embodiments, a user equipment device (UE), may comprise: a radio; and a processing element operably coupled to the radio, wherein the processing element may be configured to cause the UE to: establish communication with a base station; determine a set of capabilities of the UE; generate a capability string based on the set of capabilities; and signal the set of capabilities of the UE to the base station, wherein the signal comprises at least one of: a hash tag based at least in part on the capability string; or a compressed string based at least in part on the capability string.

In some embodiments, the processing element may be further configured to cause the UE to: receive a capability enquiry from the base station, wherein said signaling the set of capabilities is in response to the capability enquiry.

In some embodiments, the capability enquiry may comprise an indication to use at least one of: tagging; or compression, wherein the processing element is further configured to cause the UE to: signal the set of capabilities using the hash tag, if the capability enquiry indicates tagging; and signal the set of capabilities using the compressed string, if the capability enquiry indicates compression.

In some embodiments, the capability enquiry may comprise an indication of a requested frequency band.

In some embodiments, an apparatus for managing a user equipment device (UE), the apparatus may comprise a processing element configured execute program instruction to cause the UE to: establish communication with a base station; determine first information to transmit to the base station; generate a first string based on the first information; and transmit a signal of the first string to the base station, wherein the signal comprises at least one of: a tag based at least in part on the first string; or a compressed string based at least in part on the first string.

In some embodiments, the processing element may be further configured execute program instruction to cause the UE to: transmit an indication of supported compression algorithms; and receive a connection reconfiguration message from the base station, wherein the connection reconfiguration message uses one of the supported compression algorithms.

In some embodiments, the indication may comprise a radio resource control connection setup complete message.

In some embodiments, the indication may indicate that the UE does not support compression.

In some embodiments, the processing element may be further configured execute program instruction to cause the UE to: receive a first enquiry from the base station, wherein the first enquiry comprises an indication to use tagging, in response to the indication, transmit the signal of the first string comprising the tag.

In some embodiments, the tag may be based at least in part on device information, wherein the device information comprises one or more of: a region of operation; one or more configurations of the UE; one or more user settings of the UE; a hardware version of the UE; or a software version of the UE.

In some embodiments, the tag may be based at least in part on: a first hash of the first string; and a second hash of the device information, wherein the first hash or the second hash comprises a change to the first string that does not change a meaning of the first string.

In some embodiments, the device information may comprise a reserved value configured to conceal an identity of the UE.

In some embodiments, the processing element may be further configured execute program instruction to cause the UE to: receive a second enquiry from the base station, wherein the second enquiry does not indicate tagging; and in response to the second enquiry, transmit the first string to the base station.

In some embodiments, the processing element may be further configured execute program instruction to cause the UE to: in response to the second enquiry, transmit the tag to the base station.

In some embodiments, the first enquiry may comprise a requested frequency band (RFB), wherein the processing element may be further configured execute program instruction to cause the UE to: determine a band order of the RFB; adjust the band order; and generate the tag based on the adjusted band order.

In some embodiments, the adjusted band order may be based on at least one of: multiple input multiple output (MIMO) capability of the UE; or quadrature amplitude modulation (QAM) capability of the UE.

In some embodiments, the processing element may be further configured execute program instruction to cause the UE to: determine that security is established prior to transmitting the signal.

In some embodiments, a method for operating a base station, may comprise: at the base station: establishing communication with a network element; establishing communication with a user equipment device (UE); receiving an indication of capability of the UE, wherein the indication comprises at least one of: a tag, wherein the tag comprises a hash of a capability string; or a compressed capability string; and communicating with the UE according to the indication of capability.

In some embodiments, the indication may be received from the UE, and the method further may comprise, at the base station: transmitting a UE capability request comprising the tag to the network element; and receiving a full capability string from the network, wherein the full capability string corresponds to the tag.

In some embodiments, the indication may be received from the UE, wherein the indication comprises a capability string, wherein the method further may comprise, at the base station: in response to receiving the capability string, transmitting a UE capability indication to the network, wherein the UE capability indication comprises the capability string.

In some embodiments, the indication may be received from the network element, wherein the indication is comprised in one of: an initial context setup request; or a connection establishment indication.

In some embodiments, the method may further comprise, at the base station: receiving an indication that the UE supports compression; and transmitting a compression string to the UE.

In some embodiments, the compression string may comprise one of a radio resource control message or a non-access stratum signaling message.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a network device (e.g., a BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The network device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   a radio; and
   a processor operably coupled to the radio, wherein the processor is configured to cause the UE to:
   establish communication with a base station of a cellular network;
   transmit a first capability identifier tag to the base station, wherein the first capability identifier tag comprises a combination of a device hash identifier and a capability hash identifier and is set to a particular value to indicate a request to re-initiate a capability procedure;
   receive, from the base station, a capability inquiry in response to the first capability identifier tag;
   transmit a second capability identifier tag, different from the first capability identifier tag, of the UE to the base station, wherein the second capability identifier tag includes an identification associated with a manufacturer of the UE device, wherein the second capability identifier tag relates to capability information for the UE stored at the cellular network; and
   communicate, with the base station, according to the capability information.

2. The UE of claim 1, wherein the second capability identifier tag of the UE is transmitted in response to the capability inquiry.

3. The UE of claim 1, wherein the capability inquiry comprises an indication of a requested frequency band, wherein the second capability identifier tag is associated with the requested frequency band.

4. The UE of claim 1, wherein the second capability identifier tag is a unique identifier for the capability information.

5. The UE of claim 1, wherein the second capability identifier tag relates to capabilities of the UE for communication on one or more frequency bands and/or combinations of frequency bands.

6. The UE of claim 1, wherein the second capability identifier tag is based in part on a current configuration of the UE.

7. The UE of claim 1, wherein the second capability identifier tag is smaller than the capability information.

8. An apparatus, comprising:
   a processor configured to cause a user equipment device (UE) to:
   establish communication with a base station of a cellular network;
   transmit a first capability identifier to the base station, wherein the first capability identifier comprises a combination of a device hash identifier and a capability hash identifier and is set to a particular value to indicate a request to re-initiate a capability procedure;
   receive, from the base station, a capability inquiry in response to the first capability identifier;
   transmit a second capability identifier, different from the first capability identifier, of the UE to the base station, wherein the second capability identifier includes an identification associated with a manufacturer of the device, wherein the second capability identifier relates to capability information for the UE stored at the cellular network; and
   communicate, with the base station, according to the capability information.

9. The apparatus of claim 8, wherein the second capability identifier of the UE is transmitted in response to the capability inquiry.

10. The apparatus of claim 8, wherein the capability inquiry comprises an indication of a requested frequency band, wherein the second capability identifier is associated with the requested frequency band.

11. The apparatus of claim 8, wherein the second capability identifier is a unique identifier for the capability information.

12. The apparatus of claim 8, wherein the second capability identifier relates to capabilities of the UE for communication on one or more frequency bands and/or combinations of frequency bands.

13. The apparatus of claim 8, wherein the second capability identifier is based in part on a current configuration of the UE.

14. The apparatus of claim 8, wherein the second capability identifier is smaller than the capability information.

15. An apparatus, comprising:
a processor configured to cause a base station of a network to:
  establish communication with a user equipment device (UE);
  receive a first capability identifier from the UE, wherein the first capability identifier comprises a combination of a device hash identifier and a capability hash identifier and is set to a particular value indicating a request to re-initiate a capability procedure;
  transmit, to the UE, a capability inquiry in response to the first capability identifier;
  receive, from the UE, a second capability identifier of the UE that is different than the first capability identifier, wherein the second capability identifier includes an identification associated with a manufacturer of the device, wherein the second capability identifier relates to capability information for the UE stored at the network; and
  communicate, with the UE, according to the capability information.

16. The apparatus of claim 15, wherein the second capability identifier of the UE is in response to the capability inquiry.

17. The apparatus of claim 15, wherein the second capability identifier is a unique identifier for the capability information.

18. The apparatus of claim 15, wherein the second capability identifier relates to capabilities of the UE for communication on one or more frequency bands and/or combinations of frequency bands.

19. The apparatus of claim 15, wherein the second capability identifier is based in part on a current configuration of the UE.

20. The apparatus of claim 15, wherein the second capability identifier is smaller than the capability information.

* * * * *